May 13, 1969 J. G. WILSON ET AL 3,443,368
TUBULAR CENTRIFUGAL SEPARATORS
Filed July 26, 1966

INVENTORS:
JOSEPH G. WILSON
HARVEY L. FRANZEL
LE ROY H. MARKWAY
BY: *Oswald H. Milmore*
HIS ATTORNEY

United States Patent Office 3,443,368
Patented May 13, 1969

3,443,368
TUBULAR CENTRIFUGAL SEPARATORS
Joseph G. Wilson, Riverside, and Harvey L. Franzel, Westport, Conn., and Le Roy H. Markway, Metairie, La., assignors to Shell Oil Company, New York, N.Y., a corporation of Delaware
Continuation-in-part of application Ser. No. 358,742, Apr. 10, 1964. This application July 26, 1966, Ser. No. 580,132
Int. Cl. B01d 45/08
U.S. Cl. 55—435          4 Claims

ABSTRACT OF THE DISCLOSURE

A tubular centrifugal separator, suitable for close juxtaposition to others, having a vortex tube, preferably ceramic-lined, and a simplified outlet for separated solids and bleed gas, including an open trough in a bottom closure (preferably ceramic) with flow restrictive discharge holes leading through the closure from the trough.

---

Figure 1:
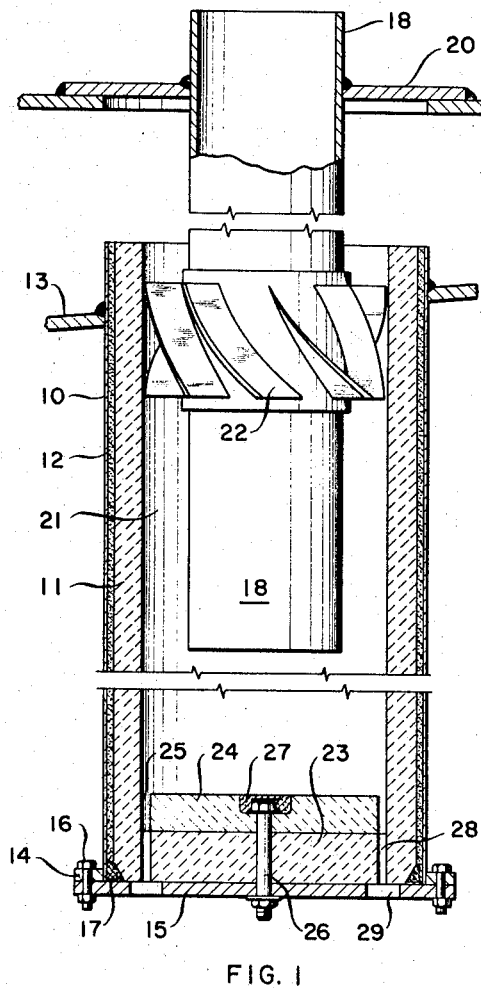

This application is a continuation-in-part of Ser. No. 358,742, filed Apr. 10, 1964 now abandoned.

This invention relates to centrifugal separators of the type employing a plurality of concentric tubes and suitable for mounting as a plurality of separators in close juxtaposition within a common casing, for the separation of entrained particles from gas. They are suitable, for example, for separating catalyst particles from hydrocarbon vapors leaving a fluidized catalytic cracking vessel or for removing such particles from combustion gases leaving a fluidized regeneration vessel. They may be mounted within such fluidized treating vessel or within a separate vessel designed principally to contain a multitude of such separators.

Separators of the general type herein considered are disclosed in the U.S. patent to Bjorklund, No. 2,986,278, and the problems of mounting them in close juxtaposition, requiring restricted outlets for the solids and bleed gas so as to achieve decoupling are described therein. Mounting of such tubes within a vessel containing a fluidized bed is shown in the U.S. patent to Beins et al., No. 3,066,854. The latter shows these small tubes to be used as the last stage of a series of centrifugal separating stages.

The discharge of the solids and bleed gas laterally through an annular slit in the bottom of the vortex tube and thence through flow-restrictive decoupling tubes, although useful, requires especially fabricated parts that must be assembled, e.g., by welding, resulting in high cost. It would be advantageous to provide a simplified discharge arrangement.

Further, it was found that on occasion rapid erosion led to a limited life of the separators, erosion being especially severe within the cup below the lateral discharge slit. Erosion of the outer vortex tube occurred also at levels above the discharge slit.

The instant invention is directed toward principally reducing erosion in such tubular separators by discharging the separated particles and bleed gas from the vortex chamber without change in direction, whereby the discharge arrangement for these materials is also simplified. One embodiment of the invention is further directed to protecting the vortex tube and end closure against erosion by an erosion-resistant material as a lining or wall for the vortex tube and/or the end closure.

In summary, according to the invention the separator comprises an outer vortex tube through which the dust-laden gas enters with vortical motion as an annular stream surrounding a clean-gas discharge tube toward an end closure which is spaced from the discharge tube, the closure having an open annular trough which is open toward said annular passage and has one or more restricted passages extending from the bottom of the trough to the outside of the separator, preferably having their oulet ends situated within the confines of the external surface of the vortex tube.

According to another feature, the said end closure is formed of wear-resistant refractory ceramic. Advantageously this closure is made of two plates, the inner one being a replaceable wear plate having an outside diameter slightly less than the interior diameter of the vortex tube so as to define the said annular trough, and the outer plate has the plurality of holes extending therethrough to receive solid particles and bleed gas from the bottom of the trough.

According to still another feature, the vortex tube is lined with wear-resistant refractory ceramic. To insure sealing of the lining against the metallic shell a seal ring of compressible material is preferably interposed between the end of the lining and a metallic rim at the end of the vortex tube shell. Further, to permit differential thermal expansion between the lining and the shell, a layer of deformable, e.g., plastic or elastic, material is interposed between the lining and the metallic shell.

Figure 3:
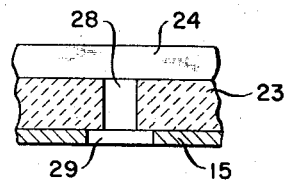
Figure 4:
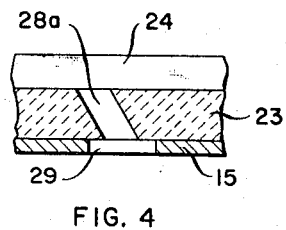
Figure 2:
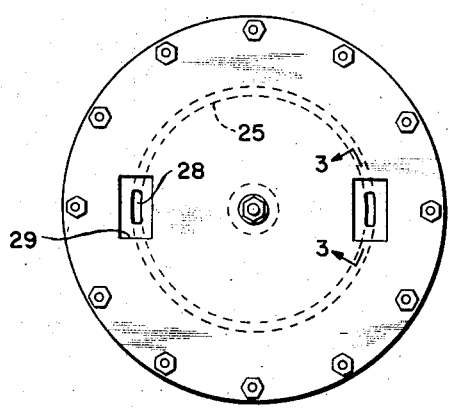

The invention will be further described with reference to the accompanying drawings showing two preferred embodiments, wherein FIGURE 1 is a vertical sectional view through a separator, parts appearing in elevation, FIGURE 2 is a bottom plan view of FIGURE 1, FIGURE 3 is a fragmentary developed sectional view taken on the curved section line 3—3 of FIGURE 2, and FIGURE 4 is a view corresponding to FIGURE 3 but showing a modified arrangement.

Referring to FIGURES 1–3, the separator comprises a vortex tube including a cylindrical metallic shell 10, a lining 11 of wear-resistant refractory ceramic, and an intermediate layer 12 of plastic insulation cement. The tube is mounted to a tube sheet 13 which may, for example, correspond to the partition 9 of the aforesaid Bjorklund patent. The bottom of the shell carries a welded flange ring 14 to which an end metallic plate 15 is attached by bolts 16. This plate is thus sealed to the metallic shell and provides an upwardly directed abutment on which is placed an annular cushion or packing 17 of compressible material, preferably of triangular cross section as shown. The bottom outer edge of the lining 11 is chamfered to fit the packing 17. Thereby the lining is effectively sealed and the blow-by of gas downwardly through the space between the shell 10 and lining 11 is prevented. It may be noted that the pressure at the top of the vortex tube is greater than at the bottom, and such blow-by would result in particle-laden gas to enter the bottom of the tube.

The vortex tube contains a concentric clean-gas discharge tube 18 extending upwardly beyond the top of the vortex tube. The top of this tube may lead to a clean-gas discharge chamber, bounded at the bottom by a wall 19, and is supported from said wall by suitable means such as an annular rim 20 welded to the tube. This tube defines between itself and the lined vortex tube an annular feed passage 21 within which are mounted a plurality of swirl or turning vanes 22 carried by the tube 18, for imparting a helical or swirling motion to the entering, particle-laden gas.

At the bottom of the vortex tube, spaced from the tube 18, is an end closure formed of two ceramic discs 23 and 24, of which at least the inner disc 24 is preferably of wear-resistant refractory. The disc 23 is supported by the end plate 15 and may be peripherally integral with the lining 11. The disc 24 rests on the disc 23 and is of smaller diameter than the internal diameter of the lining, so as to leave an annular channel or trough 25, preferably immediately adjoining the lining 11, in direct communication with the passage 21. The two discs are secured by a bolt 26 which is recessed in the upper disc, the recess being filled with cement 27. The upper disc thus forms a replaceable wear plate.

The lower disc has one or more, e.g., two, small holes 28 which define restricted discharge holes in communication with the bottom of the trough 25. It is evident that when the disc 23 is not integral with the lining 11 the holes 28 may be formed as peripheral notches on the disc, which then is fitted against the said lining. The metal plate 15 has larger holes 29 aligned with the holes 28 to permit separated solid particles and bleed gas to flow out. In this embodiment the holes 28 are parallel to the central axis of the vortex tube.

In the variant shown in FIGURE 4 the holes 28a are inclined in a common circumferential direction to the axis of the vortex tube, preferably in the direction to facilitate gas and particles flowing into the trough with a swirling motion to enter holes.

In operation the gas, burdened with finely divided solids, enters the open end of the vortex tube from above the tube sheet 13, is given a swirling motion by the vanes 22, and flows down into the space beneath the tube 18. The swirling motion causes the solid particles to be flung outwardly against the lining 11, and the clean gas ascends through the tube 18. The separated particles, together with some bleed gas, enter the trough 25 without change in flow direction, thereby reducing the erosion. Thence, they are swept through the trough into the holes 28. Upon entering these holes the bleed gas encounters flow resistance, incident to the entry of a gas stream into an orifice. Additional frictional resistance is encountered in flow through the holes 28, although loss of head due to friction is often smaller than that due to entrance resistance, particularly when these holes are short. The combined loss of head is effective to decouple the separator from the other separators which may be mounted in close juxtaposition.

Generally for satisfactory service the amount of bleed gas flowing through the holes 28 is a minor fraction, e.g. about 1–10% of the gas entering the vortex tube. Taking into consideration the amount of bleed gas, flow resistance to provide effective loss of head, and the like, total inlet cross-sectional area of holes 28 is about 0.1% to 6%, preferably about 0.2% to 2% of the internal cross-sectional area of the vortex tube.

It is also to be noted from FIGURE 1 that disc 24 is shown as a cylinder, and as such defines a cylindrical trough. If desired, disc 24 may be in the form of a truncated cone, and mounted in an inverted position so that the top or inlet to the trough 25 is smaller than the bottom of the trough. Advantageously, the width of the trough at the inlet end is such that abnormally large particles cannot enter the trough which otherwise may lead to bridging or plugging of holes 28.

We claim as our invention:
1. A tubular centrifugal separator for separating gas from particles entrained therein, which comprises:
   (a) an outer vortex tube which includes
      (1) an outer metallic shell
      (2) a closure sealed to one end of the shell,
      (3) a lining of ceramic within the shell,
      (4) a layer of deformable material interposed between said lining and shell to permit relative motion due to differential thermal expansion, and
      (5) an annular cushion of compressible material disposed between the end of said lining and the closure, the cushion abutting against the closure and the inner side wall of the metallic shell,
   (b) a clean-gas discharge tube which is situated at least partly within said vortex tube and spaced from said closure, said discharge tube defining between itself and the vortex tube an annular feed passage,
   (c) inlet means for admitting gas burdened with particles to said feed passage for flow toward said closure and for imparting vortical motion to said gas, and
   (d) outlet means for particles and bleed gas comprising:
      (1) an open annular trough formed on the inner side of said end closure in open communication with said feed passage having an external diameter substantially equal to the inner diameter of the vortex tube, and
      (2) one or more restricted passages extending through said end closure from the bottom of said trough to the outer-side of said closure.

2. A separator as defined in claim 1 wherein said closure comprises:
   (a) an outer thick plate having a plurality of holes extending therethrough constituting said restricted passages, and
   (b) an inner plate situated on the inner face of said outer plate and having an external diameter less than that of the vortex tube and defining the radially inner edge of said annular trough, at least one of said plates being formed of erosion-resistant refractory ceramic.

3. A separator as defined in claim 2 wherein said holes extend parallel to the axis of the vortex tube.

4. A separator as defined in claim 2 wherein said holes are inclined in a common circumferential direction with respect to the axis of the vortex tube.

References Cited

UNITED STATES PATENTS

| | | | |
|---|---|---|---|
| 711,026 | 10/1902 | Updike | 110—1 |
| 1,801,044 | 4/1931 | Hawley | 55—426 |
| 1,844,369 | 2/1932 | Ross | 55—267 X |
| 1,922,013 | 8/1933 | Brady | 55—435 X |
| 2,846,024 | 8/1958 | Bremi | 55—426 X |
| 2,887,177 | 5/1959 | Mund et al. | 55—502 X |
| 2,960,184 | 11/1960 | Deithlhauser | 55—452 X |
| 2,986,278 | 5/1961 | Bjorklund | 209—144 |
| 3,057,148 | 10/1962 | Kimpel et al. | 110—1 |

HARRY B. THORNTON, *Primary Examiner.*

U.S. Cl. X.R.

55—449, 456